Mar. 3, 1925. 1,528,315
A. BARR ET AL
INSTRUMENT FOR MEASURING THE INTERNAL CIRCUMFERENCE
OF TIRES AND LIKE RINGS
Original Filed July 15, 1922
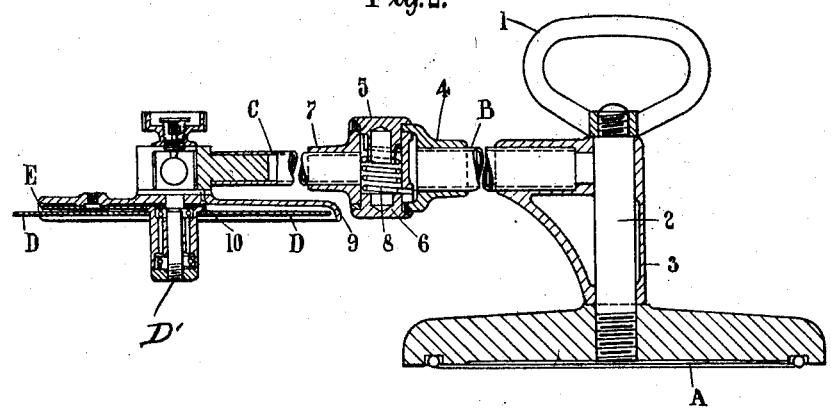
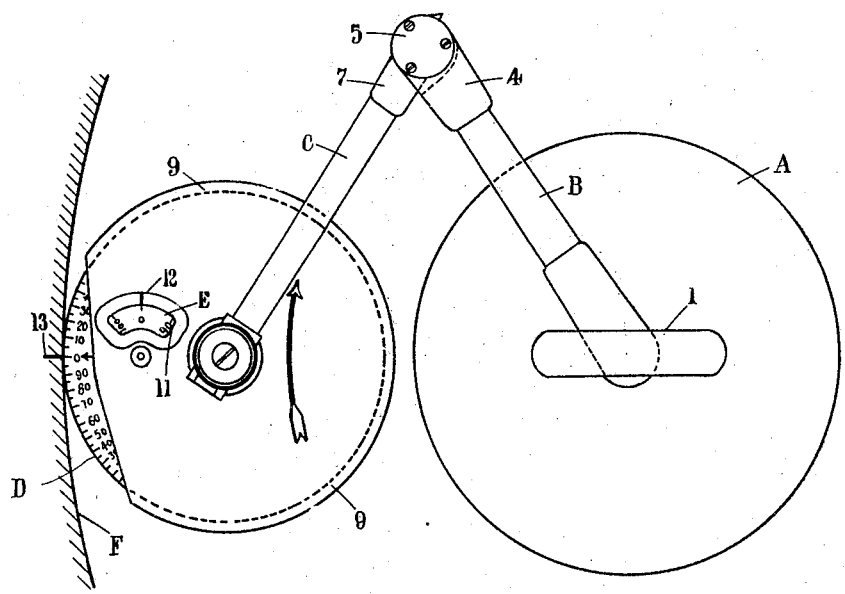

Patented Mar. 3, 1925.

1,528,315

UNITED STATES PATENT OFFICE.

ARCHIBALD BARR AND WILLIAM STROUD, OF GLASGOW, SCOTLAND, AND WALTER DE LA ROCHE BOND, OF BIRMINGHAM, ENGLAND, ASSIGNORS TO BARR AND STROUD, LIMITED, OF GLASGOW, SCOTLAND.

INSTRUMENT FOR MEASURING THE INTERNAL CIRCUMFERENCE OF TIRES AND LIKE RINGS.

Application filed July 15, 1922, Serial No. 575,306. Renewed January 2, 1925.

*To all whom it may concern:*

Be it known that we, ARCHIBALD BARR and WILLIAM STROUD, subjects of the King of Great Britain and Ireland, and both of Caxton Street, Anniesland, Glasgow, Scotland, and WALTER DE LA ROCHE BOND, a subject of the King of Great Britain and Ireland, and of Fort Dunlop, Erdington, Birmingham, England, have invented new and useful Improvements in Instruments for Measuring the Internal Circumferences of Tires and like Rings, of which the following is a specification.

This invention relates to means for measuring the internal circumferences of rings, more especially of steel tires which may not be truly circular.

The object of this invention is to produce an instrument of the measuring disc type comprising an axial support, arranged to occupy an approximately central position within the ring of which the internal circumference is to be measured, a carrier on the support mounted to turn about the axis thereof, the carrier having means for supporting the measuring disc arranged to maintain the axis of the disc parallel with the axis of the support and the rim of the disc in one and the same plane, and having means tending to thrust the disc outwards from the axial support.

In one example of construction the measuring disc may be mounted upon a fork or other device carried by an arm swivelling about the axial support, and by means, say, of a spring (or springs) a force is produced tending to thrust the measuring disc outwards from the axial support and means are provided to maintain the axis of the disc parallel to the axis of the axial support.

To measure the internal circumference of, say, a tire, the tire may be laid upon a flat floor. The axial support, consisting, say, of a heavy stand, is placed on the floor somewhere near the centre of the tire, a zero mark on the measuring disc is placed exactly in coincidence with a position mark on the tire, the jointed arm, carrying the disc, is turned about the axial support so as to make one complete turn whereby some part of the circumference of the disc is again brought into contact with the position mark, when, from the reading of the disc, the circumference of the tire may be deduced, note having been taken of the number of complete revolutions of the disc.

To get the readings in millimetres, it is convenient to make the circumference of the measuring disc an exact multiple of 10-cms. (thus, e. g., it may be 10, 20 &c., cms.). As it is not generally desirable that the measuring disc should make many turns in covering one revolution of a tire, the circumference of the measuring disc may be, say, 50-cms. or 60-cms. or even more for an instrument designed for measuring tires for vehicles.

To read off the total number of complete turns of the discs per circumference of a tire, a dial may be provided so geared to the measuring disc that one revolution of the disc produces a fraction of a revolution of the dial. The dial may be suitably graduated and an index provided.

Thus, to read the internal circumference of any tire lying between 2,000 and 2,999-mm., one starts with the zero mark of the dial opposite its index, and the zero mark of the measuring disc placed in coincidence with the position mark on the tire, the jointed arm is then turned through exactly one revolution so that the periphery of the disc is again in contact with the tire at the position mark and record the first figure 2 (common to all the tires considered), then the lower of the two readings on the dial between which the dial index falls, then the reading on the disc opposite the position mark as an index.

In addition to uniformly spaced graduations being marked on the measuring disc, standard marks corresponding to certain standard sizes of tires in common use may be provided; and further, tolerance marks above and below the standard marks may be provided to indicate the tolerances that may be allowed below and above the standard sizes. One convenient way of doing this is to provide broad standard marks so arranged that, if the tire is within the allowable tolerances of the standard size, this will be indicated by the position mark on the tire falling (after the measuring disc has performed one complete circuit of the internal circumference of the tire) within the limits of the broad standard mark. Such standard marks may have engraved opposite them the standard diameter or circumference to which they relate.

An example of an instrument constructed according to this invention will now be described with reference to the accompanying drawing in which:—

Figure 1 is a plan and Figure 2 is a broken sectional elevation. In Figure 2 the members of the jointed arm to be described are shown extended.

In the drawing the axial support illustrated comprises a heavy base A provided with a handle 1 fixed to the base by a shaft 2. Mounted to turn about the shaft 2 is a sleeve 3 to which is fixed one end of a member B, the other end of B being fixed to a part 4 forming part of a swivelling joint 4, 5, 6, 7, where 5 and 6 are two bushes fixed respectively to the parts 7 and 4, and 7 is a part to which is fixed one end of a member C. A jointed arm is thus formed comprising the members B and C. Between the parts 5 and 6 there is arranged a helical spring 8 in considerable torsion, the direction of the torsional couple being such as to tend to increase the size of the angle between the members B and C of the jointed arm. The outer end of the member C carries a case 9 within which is mounted a measuring disc D supported on bearings about a spindle D' carried by the case 9. Fixed to disc D is a toothed wheel 10 which gears with the toothed rim of an index dial E, a portion of the surface of which is visible through a window 11 in the case 9 the outside of which is provided with an index mark 12.

In using the apparatus it is set up as shown in Figure 1, a position mark designated 13 is made upon the inner surface of the tire F, and the disc D is turned until the zero mark on the dial E is opposite the index mark 12. This operation is carried out while the disc D is out of contact with the internal circumference of the tire F, and when this operation is completed the disc D is placed into contact with the tire F with the zero mark on the disc D exactly opposite the mark 13 and is maintained in contact with the internal surface of the tire by the action of the spring 8. The case 9 may now be turned in the direction of the arrow through one revolution about the shaft 2 when the reading upon the dial E and disc D will enable the magnitude of the circumference to be read off.

The apparatus illustrated is portable and is intended to be used on a horizontal surface. It can, however, be fixed and may be used in a vertical plane, in which case the base A may be dispensed with and the shaft 2 may be fixed at the appropriate height, say, to a wall.

We claim:—

1. An instrument of the measuring disc type comprising an axial support, a carrier on the support mounted to turn about the axis thereof, a measuring disc, means for supporting the measuring disc on the carrier, means for maintaining the axis of the disc parallel with the axis of the support and the rim of the disc in one and the same plane, and means tending to thrust the disc outwards from the axial support, for the purposes set forth.

2. An instrument of the measuring disc type comprising an axial support, a jointed arm on the support mounted to turn about the axis thereof, a bearing at the outer end of the jointed arm, a measuring disc supported by the bearing, means for maintaining the axis of the disc parallel with the axis of the support, and means tending to thrust the disc outwards from the axial support, for the purposes set forth.

3. An instrument of the measuring disc type comprising an axial support, a jointed arm on the support mounted to turn about the axis thereof, the jointed arm comprising an inner member pivoted to the support and an outer member jointed to the inner member, a bearing at the outer end of the outer member, a measuring disc supported by said bearing arranged to maintain the axis of the disc parallel with the axis of the support and means tending to thrust the disc outwards from the axial support, for the purposes set forth.

4. An instrument of the measuring disc type comprising an axial support, a jointed arm on the support mounted to turn about the axis thereof, the jointed arm comprising an inner member pivoted to the support, an outer member and a joint between the inner and outer members, a bearing at the outer end of the outer member, a measuring disc supported by said bearing arranged to maintain the axis of the disc parallel with the axis of the support, and a spring in the joint between the members of the arm tending to thrust the disc outwards from the axial support, for the purposes set forth.

5. A portable instrument of the measuring disc type comprising an axial support having a heavy base, a carrier on the support mounted to turn about the axis thereof, a measuring disc, means for supporting the measuring disc on the carrier, means for maintaining the axis of the disc parallel with the axis of the support and the rim of the disc in one and the same plane, and means tending to thrust the disc outwards from the axial support, for the purposes set forth.

6. An instrument of the measuring disc type comprising an axial support, a carrier on the support mounted to turn about the axis thereof, a measuring disc, means for supporting the measuring disc on the carrier, a dial index connected by gearing with the measuring disc, means for maintaining the axis of the disc parallel with the axis of the support and means tending to thrust the disc outwards from the axial support, for the purposes set forth.

7. An instrument of the measuring disc type comprising an axial support, a carrier on the support mounted to turn about the axis thereof, a bearing on the carrier, a measuring disc supported by the bearing, a zero mark, uniform graduations and a standard mark or standard marks on the measuring disc, a dial index connected by gearing with the measuring disc, means for maintaining the axis of the disc parallel with the axis of the support and the rim of the disc in one and the same plane, and means tending to thrust the disc outwards from the axial support, for the purposes set forth.

8. An instrument of the measuring disc type comprising an axial support, a jointed arm on the support mounted to turn about the axis thereof, the jointed arm comprising an inner member pivoted to the support, an outer member, and a joint between the inner and outer members, a bearing at the outer end of the outer member, a measuring disc supported by the bearing arranged to maintain the axis of the disc parallel with the axis of the support, a dial index connected by gearing with the measuring disc, a zero mark and graduation marks on the measuring disc, and a spring in the joint between the members of the arm tending to thrust the disc outwards from the axial support, for the purposes set forth.

ARCHIBALD BARR.
WILLIAM STROUD.
WALTER DE LA ROCHE BOND.